T. WILSON.
VEHICLE FRAME SUSPENSION.
APPLICATION FILED FEB. 17, 1917.

1,252,759.

Patented Jan. 8, 1918.

WITNESSES
Frederick Dies
A. L. Kitchin

INVENTOR
Thomas Wilson
BY
ATTORNEYS

UNITED STATES PATENT OFFICE.

THOMAS WILSON, OF DOWNIEVILLE, CALIFORNIA.

VEHICLE-FRAME SUSPENSION.

1,252,758.

Specification of Letters Patent.  Patented Jan. 8, 1918.

Application filed February 17, 1917. Serial No. 149,193.

*To all whom it may concern:*

Be it known that I, THOMAS WILSON, a citizen of the United States, and a resident of Downieville, in the county of Sierra and State of California, have invented a new and Improved Vehicle-Frame Suspension, of which the following is a full, clear, and exact description.

This invention relates to spring suspensions for four wheel motor vehicles, and has for an object the provision of an improved arrangement of springs and associated parts whereby a jolt is cushioned and a rebound is absorbed.

Another object in view is to provide a suspension in which the springs are connected at one end with a suspension bar and at the other with a body either directly or through coacting springs.

A still further object in view is to provide a suspension in which is arranged a suspending frame which may be moved slightly longitudinally independent of the body and to which one end of the supporting springs is secured.

Figure 1:
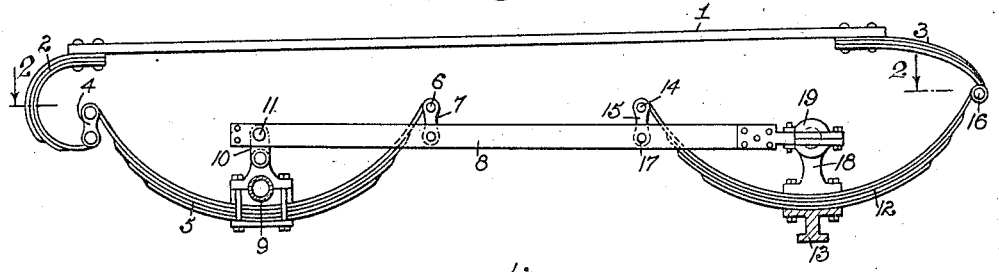
Figure 1 is a side view of a suspending structure disclosing an embodiment of the invention.

Referring to the accompanying drawing by numerals, 1 indicates the body of a vehicle, as for instance, a four wheeled motor or power driven vehicle, having any kind of a suitable drive, as for instance, a chain drive. Connected with the body 1 are quarter-elliptical springs 2 and 3 rigidly secured at or near the end of body 1. Spring 2 is connected with a link 4 to which a semi-elliptical spring 5 is connected, said last mentioned spring being pivotally mounted at 6 on link 7, which link in turn is pivotally mounted upon the suspension frame 8. The spring 5 at the central point is clamped to the rear axle 9 of the vehicle, while above the axle is arranged a link 10 having a pin 11 which extends through the end of frame 8 whereby said frame is pivotally connected with the link and is thereby allowed a limited free longitudinal movement, said movement being resisted or caused by the spring 5. At the front of the vehicle a semi-elliptical leaf spring 12 is clamped to the axle 13 with one end pivotally connected at 14 to the link 15 and the other pivotally connected at 16 to spring 3. The link 15 is pivotally connected at 17 to the suspension frame 8 whereby a large part of the up and down movement of axle 13, as well as axle 9, will be transmitted to the suspension frame 8 and thereby distributed evenly to the body 1 or absorbed before any movement can be transmitted to said body.

The suspension frame 8 is connected to the axle 3 through a fitting 18, which fitting includes a ball and socket arrangement 19 whereby a substantially universal movement is given to the suspension frame at the forward part, while a back and forth movement is allowed at the rear part by reason of the link 10. The frame 8, springs 5 and 12 and associated parts have been described in detail while the opposite suspension frame 8' and associated parts have not been described in detail as the same are of identical construction with those just described. It is of course understood that there are four main springs, namely, two springs 5 and two springs 12, together with proper connecting parts as described and shown in connection with Fig. 1. If desired, bracing members may be provided for connecting the respective suspension frames 8 and 8', said bracing members being bent so as to be out of the way of the transmission mechanism and to allow a proper independent up and down or back and forth movement of either of the frames. However, usually the respective frames 8 and 8' are provided with bracing bars 20 and 21, riveted or otherwise rigidly secured at 22 and 23 and pivotally mounted at 24 and 25, respectively.

Figure 3:
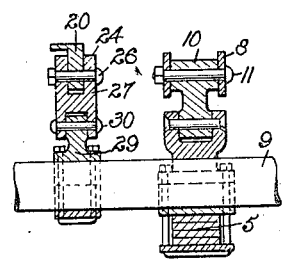
Fig. 3 is an enlarged detail fragmentary sectional view through Fig. 2 on line 3—3.

As shown in Fig. 3, the pivotal mounting at 24 consists of having a pin 26 extend through the bar 20 and link 27, while link 27 is connected to a fitting 29 by pin 30, and fitting 29 is rigidly clamped to the axle 9. The pivotal movement of the connection 24 is substantially equal to the pivotal movement allowed by link 10 so that the frame 8 may be properly braced while at the same time allowing the proper longitudinal movement. The pivotal connection at 25 is identical with that shown at 24 and will therefore need no additional description.

Figure 2:
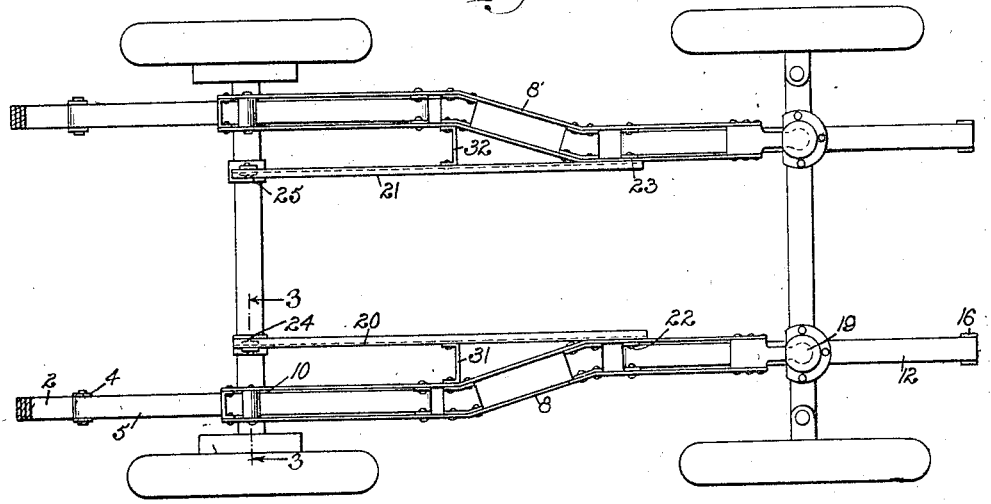
Fig. 2 is a section through Fig. 1 approximately on line 2—2, part of the running gear being shown in connection therewith.

To stiffen and further brace the suspension frames 8 and 8' transverse cleats or brackets 31 and 32 are provided intermediate the length of the bars 20 and 21, as shown in Fig. 2.

Figure 4:
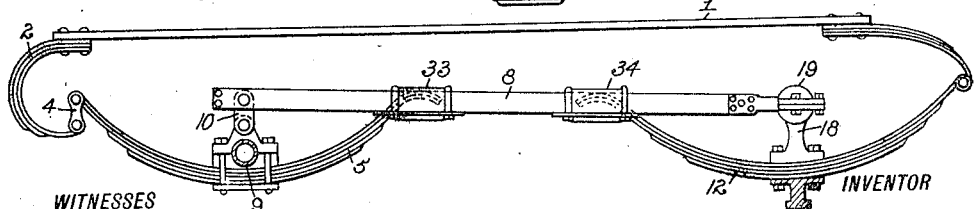
Fig. 4 is a view similar to Fig. 1 but disclosing a modified form of the invention.

In Fig. 4 a slightly modified form of the invention is seen in which springs 5 and 12 are not connected directly to the frame 8 but are caused to frictionally bear against saddles 33 and 34, said saddles being rigidly clamped or in any manner secured to the frame 8. It will be evident that the suspension frame 8 may also be connected below the front and rear axles of the vehicle without departing from the spirit of the invention.

What I claim is:

1. In a suspension of the character described, a pair of semi-elliptical springs connected with each axle of a vehicle, means for connecting one end of each of the springs to the body of the vehicle, an independently movable suspension frame connected with said axles, and means for connecting the other ends of said semi-elliptical springs to said suspension frame.

2. In a suspension device of the character described, the combination with a vehicle, of a suspension frame arranged adjacent each a suspension frame arranged adjacent each side of the vehicle, a plurality of semi-elliptical springs, one end of each spring connected with each end of each of said frames, and said springs connected with the axles of said vehicle, and means for connecting the other ends of all of said springs to the body of said vehicle.

3. In a spring suspension for vehicle bodies, a plurality of semi-elliptical springs, means for connecting one end of each of said springs with said body, a suspension frame below said body, and means for connecting the other end of each of said semi-elliptical springs pivotally to said suspension frame.

4. In a suspension of the character described, a suspension frame universally journaled at one end to the axle of the vehicle, a plurality of semi-elliptical springs pivotally connected to said frame between its ends, and means for connecting the opposite ends of said springs to the body to be supported thereby.

5. In a suspension of the character described, the combination with a vehicle, of a plurality of suspension frames, each of said frames being substantially universally connected with the front axle of the vehicle and pivotally connected with the rear axle of said vehicle, a semi-elliptical spring arranged adjacent each end of each suspension frame and connected to the corresponding axle of said vehicle, means for pivotally connecting one end of each of said springs to said suspension frame between the ends of the suspension frame, and means for connecting the opposite ends of said springs to the body of said vehicle.

6. In a suspension of the character described, the combination with a vehicle, of a suspension frame substantially universally connected with the front axle of said vehicle, means for pivotally connecting said frame with the rear axle of the vehicle, a spring arranged adjacent each end of said suspension frame and connected to the front and rear axles, respectively, means for pivotally connecting one end of each of said springs to said suspension frame, and means for connecting the opposite ends of said springs to the body of said vehicle.

7. In a suspension device of the character described, the combination with a vehicle having a front and rear axle and a body, of a plurality of suspension frames, a ball and socket arrangement for each of said frames for connecting the same with the front axle of the vehicle, link structures for connecting the frames with the rear axle whereby the frames are each allowed an independent horizontal movement, and a pair of semi-elliptical springs for each of said frames pivotally connected at one end to said frames and at the other to said body, said springs being also connected to said axles whereby the springs absorb most of the shock brought to bear thereon.

8. In a suspension device of the character described, a loosely mounted independently movable suspension frame, a pair of semi-elliptical springs, means for connecting one end of each of said semi-elliptical springs to a body to be supported, and means for transmitting motion from the other ends of said semi-elliptical springs to said suspension frame.

9. In a suspension device of the character described, the combination with a vehicle, of a pair of suspension frames, articulated means for connecting the front end of each of said frames to the front axle of said vehicle, a link for each of said frames for providing a pivotal connection with the rear axle of said vehicle and allowing a fore and aft movement of the frames, a bracing structure connected to each of said frames between the ends, means for connecting one end of each of said bracing structures pivotally with said rear axle, a semi-elliptical spring for each end of each of said suspension frames, said springs being connected with said axles, means for movably connecting one end of one pair of springs with each of said frames, and means for connecting the opposite ends of all of said springs with the body of the vehicle.

THOMAS WILSON.